United States Patent
Morris

(10) Patent No.: US 6,763,058 B1
(45) Date of Patent: Jul. 13, 2004

(54) LOW SIGNAL TO NOISE RATIO ACQUISITION AND LINK CHARACTERIZATION TECHNIQUES FOR VSAT SPREAD SPECTRUM MODEMS

(75) Inventor: James R. Morris, Reston, VA (US)

(73) Assignee: Northrop Grumman Corporation, Redondo Beach, CA (US)

(*) Notice: Subject to any disclaimer, the term of this patent is extended or adjusted under 35 U.S.C. 154(b) by 640 days.

(21) Appl. No.: 09/604,461

(22) Filed: Jun. 27, 2000

(51) Int. Cl.[7] ............................................. H04B 1/707
(52) U.S. Cl. .................... 375/141; 375/146; 375/147; 375/150
(58) Field of Search ................... 375/130, 133, 375/141, 142, 146, 147, 150; 370/320, 335, 342

(56) References Cited

U.S. PATENT DOCUMENTS

| | | | |
|---|---|---|---|
| 5,237,587 A | | 8/1993 | Schoolcraft |
| 5,596,601 A | * | 1/1997 | Bar-David ................... 375/143 |
| 5,703,902 A | * | 12/1997 | Ziv et al. .................... 375/228 |
| 5,712,869 A | | 1/1998 | Lee et al. |
| 5,956,328 A | * | 9/1999 | Sato ........................... 370/335 |
| 5,960,040 A | | 9/1999 | Cai et al. |
| 6,104,748 A | * | 8/2000 | Kaku ......................... 375/235 |

FOREIGN PATENT DOCUMENTS

| | | |
|---|---|---|
| EP | 0 903 870 A2 | 3/1999 |
| EP | 0 903 870 A3 | 10/2002 |
| JP | 6-296171 | 10/1994 |
| JP | 63-196129 | 8/1998 |
| JP | 10-271174 | 10/1998 |
| JP | 2001-186052 | 7/2001 |

OTHER PUBLICATIONS

Communication from European Patent Office regarding counterpart application.

Keizo Suzuki, Shinya Okuyama, "Low Threshhold SS Demodulator Using Front–end Correlator", Shingaku Gihoh., IEICE spread spectrum technology and its application institute, SSTA91–2, pp. 5–11 (1991) including English translation of abstract.

* cited by examiner

*Primary Examiner*—Young T. Tse
(74) *Attorney, Agent, or Firm*—Harness, Dickey & Pierce, P.L.C.

(57) ABSTRACT

A direct sequence spread spectrum (DS-SS) communications modem for low signal to noise ratio applications and secure communications systems (10). The modulator (22) implements a quadrature-phase shift keying (QPSK) modulation scheme in which a pseudonoise code is supplied to one channel and a pseudonoise code is combined with data to define the other channel. The demodulator (34) receives the modulated signal and utilizes a signal acquisition processor (92) in order to detect the pseudonoise code applied to the first channel. Upon detection and acquisition of the first pseudonoise code, the second pseudonoise code may be determined in order to demodulate the second channel to yield the modulated data. The signal acquisition processor (92) provides numerous parametric measurements to enable fine demodulator tuning and robust acquisition of the pseudonoise spreading codes on the I and Q channels.

18 Claims, 6 Drawing Sheets

LOW SIGNAL TO NOISE RATIO ACQUISITION AND LINK CHARACTERIZATION TECHNIQUES FOR VSAT SPREAD SPECTRUM MODEMS

GOVERNMENT LICENSE RIGHTS

The U.S. Government has certain rights in this invention pursuant to the FAR Clause 52.227-12.

BACKGROUND

1. Technical Field

The present invention relates generally to modems for very small aperture terminal satellite communications systems and, more particularly, to modems for improved direct sequence spread spectrum communication systems.

2. Discussion

The term VSAT stands for very small aperture terminal. VSAT systems typically support satellite communications networks over a two-way communication link. VSAT systems may have particular applicability to banking and financial institutions, airline and booking agencies, and retail stores which cover large geographical areas. VSAT systems have facilitated the growth and connectivity of a worldwide telecommunications infrastructure. Particularly, VSAT systems may connect remote and undeveloped regions with modern communication facilities of major cities, via commercial satellite communication links.

A typical VSAT network includes a hub station that provides network control for all VSATs in the network. A VSAT system may include individual VSATs that access communication satellite transponders using a variety of multiple-access modes. In a typical link from a hub to a VSAT, the hub terminal broadcasts a signal for reception by all VSATs in the network. The outlying VSAT terminals will transmit to other VSATs or the hub terminal using established protocols.

A variety of communication modes may be used to establish connectivity from individual VSAT terminals to the hub. Access methods include code division multiple access (CDMA), frequency division multiple access (FDMA), and time-division multiple access (TDMA). The traffic in a VSAT network is typically data, transferred in packets or bursts, such as in an inventory control system, that occur at random and possibly infrequent intervals. One data transfer method for frequency re-use is direct sequence spread spectrum (DS-SS) code division multiple access (CDMA).

In CDMA, each signal is assigned a unique pseudonoise (PN) code that spreads the signal spectrum. While all signals may be received simultaneously by a receiver, a unique PN code enables recovery of the desired signal by correlating the PN code with the received signal. Other signals occupying the transponder channel appear as random noise to the spread spectrum demodulator. In a typical CDMA application, the code rate must be much greater than the traffic rate and is purposely chosen to spread the signal spectrum over the available transponder bandwidth.

An exemplary spread spectrum implementation, as applied to CDMA, will employ a large number of mutually low cross-correlation pseudorandom codes. A pseudorandom code will have some characteristics of a purely random sequence, but generally has an underlying deterministic structure. A typical pseudorandom code comprises a finite-length binary sequence which is used to phase modulate the carrier. By providing a copy of the pseudorandom code to the receiver, the spread spectrum signal may be correlated with this code and despread, to recover the baseband signal or underlying data.

The finite-length binary sequence has many of the properties typically associated with wideband noise, and thus is often referred to as pseudonoise (PN). The binary sequence is nominally generated by a linear or nonlinear feedback shift register generator. The PN bits are commonly referred to as chips, to avoid confusion with the bits in the underlying baseband signal or traffic.

The PN sequence or code generator is typically clocked at a uniform rate which exceeds the underlying data bit rate or traffic data rate by some constant factor, related to the processing gain of the spread spectrum system.

Spread spectrum signal systems may be configured to reject intentional and unintentional jamming by interfering signals so that information can be communicated, particularly in some military scenarios. Sustained performance of mobile or ground communication terminals in a severe interference or jamming environment is a particularly attractive feature of spread spectrum communication. Many of these systems also employ direct sequence spread spectrum techniques to provide a measure of covertness in a high surveillance environment.

Spread spectrum signals have a low probability of intercept or detection because the power in a transmitted signal is spread over a large bandwidth or frequency space. Further, such signals cannot be readily detected without knowing certain signal parameters, thereby ensuring message privacy. The ability to send many orthogonal signals over the same frequency band provides a frequency re-use feature for CDMA spread spectrum signals. Certain terrestrial wireless local area network and cellular communications systems employ CDMA and spread spectrum techniques to support cellular communications.

Many spread spectrum communication systems utilize conventional quadrature phase shift keying (QPSK) modulation schemes which utilize both the in-phase (I) and quadrature phase (Q) channels to convey information. While such a modulation scheme may be efficient from a power perspective, a conventional direct sequence spread spectrum signal must acquire the PN codes at signal to noise (SNR) ratios close to those employed for communications. Such a requirement results from nearly equivalent I channel and Q channel processing gains.

There is a need for a more precise signal parameter measurement system used in conjunction with a QPSK spread spectrum system. Such a system enables improved acquisition and signal tracking performance when the quality of the communication link is poor or where minimum power levels are preferably used to implement the communication.

SUMMARY OF THE INVENTION

The present invention is directed to spread spectrum modem apparatus including a modulator for modulating data and spread spectrum code information onto a spread spectrum signal. The spread spectrum signal has a first channel component and a second channel component. Data and a first spread spectrum code is modulated onto the first channel component, and a second spread spectrum code is modulated onto the second channel component. A demodulator receives the spread spectrum signal and acquires the second spread spectrum code in the second channel component and acquires the first spread spectrum code based upon the acquired second spread spectrum code information.

The demodulator determines the data by despreading the spread spectrum signal based upon the acquired first and second spread spectrum code information.

For a more complete understanding of the invention, its objects and advantages, reference should be made to the following specification and to the accompanying drawings.

DESCRIPTION OF THE PREFERRED EMBODIMENT

Figure 1:
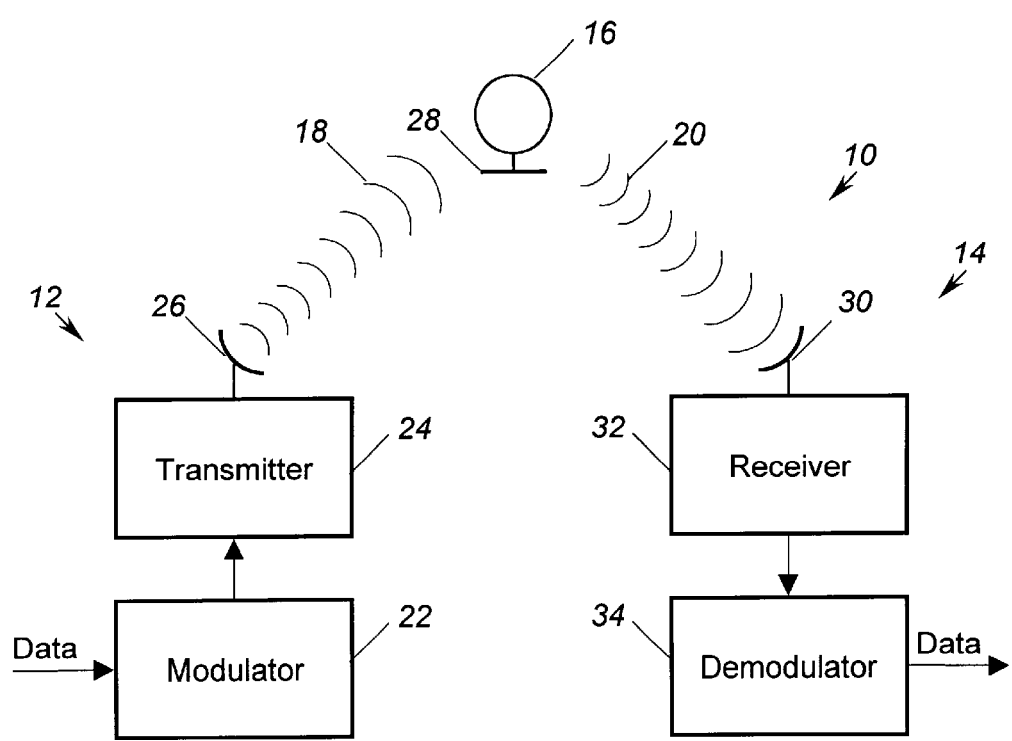
FIG. 1 is a block diagram of a VSAT spread spectrum communications system arranged in accordance with the principles of the present invention.

With reference to the figures, FIG. 1 depicts a communications system 10 which comprises portions of a first very small aperture terminal (VSAT) 12 and a second VSAT 14. The VSATs 12, 14 communicate via a satellite link provided by satellite 16. As shown in FIG. 1, first VSAT 12 transmits a communication signal 18 to satellite 16. Satellite 16 relays communication signal 18 to second VSAT 14 by transmitting communication signal 20 to second VSAT 14. Satellite 16 is typically known as a non-regenerative repeater.

First VSAT 12 includes a modulator 22 which receives data and modulates the data into a signal suitable for communication by transmitter 24. Transmitter 24 includes an antenna 26 which transmits a communication signal 18 to antenna 28 on satellite 16. As described above, satellite 16 relays communication signal 18 to second VSAT 14 by translating the received signal and radiating signal 20. Second VSAT 14 includes an antenna 30 which receives communication signal 20 for input to receiver 32. Receiver 32 receives the modulated signal for input to demodulator 34. Demodulator 34 demodulates the received signal and outputs the data.

One skilled in the art will recognize that while first VSAT 12 has been described as having a modulator 22 and second VSAT 14 has been described as having a demodulator 34, each VSAT 12, 14 may include a modulator 22 and demodulator 34 to define a single modem configured as part of each VSAT 12, 14. Accordingly, such a VSAT can modulate data onto a carrier for transmission and can receive a modulated carrier for demodulation into data.

Communication system 10 is embodied as a direct sequence spread spectrum (DS-SS) modem. Communication system 10 utilizes a modified quadrature phase shift keying (QPSK) signal. The modified QPSK signal has an in-phase I channel component and a quadrature-phase Q channel component. The in-phase channel component carries a short acquisition PN code, and the quadrature-phase channel carries the underlying data. The underlying data carried by the quadrature-phase channel comprises a binary or modulo-2 representation added to a long and secure PN code. The short PN code is detected and removed using a conventional sliding correlator and replica generator. Removing the short acquisition PN code from the in-phase channel provides a despread I channel, resulting in a pure carrier tone. The pure carrier tone may be detected using well understood Fast Fourier Transform (FFT) techniques. As will be described, the exact frequency, amplitude, and phase for the in-phase channel processing provides input for a control algorithm to acquire the precise downlink frequency, monitor environmental path losses, and acquire PN code timing. The in-phase channel processing will take place at received signal to noise ratios (SNRs) which are well below the minimum signal to noise ratio required for data communication. A typical minimum signal to noise ratio for communication is approximately 10 decibel (dB). The in-phase channel processing can either augment or replace conventional PN code acquisition circuitry.

Figure 2:
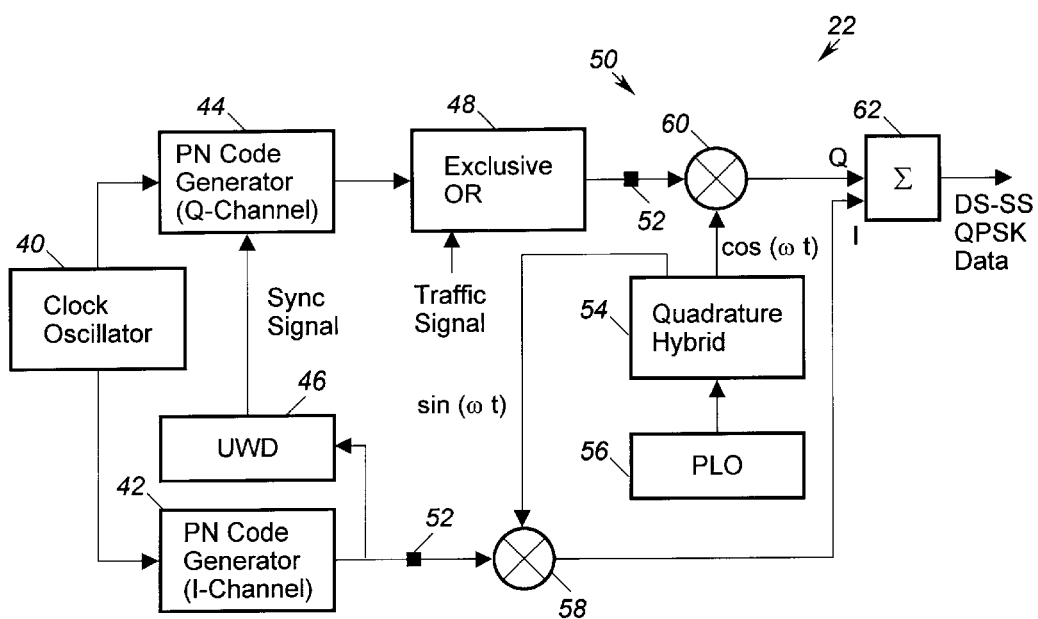
FIG. 2 is a block diagram of the modulator portion of the spread spectrum modem of FIG. 1.

FIG. 2 depicts an expanded block diagram of modulator 22 of FIG. 1. Modulator 22 generates a QPSK signal to facilitate the CDMA signal implementation. Modulator 22 includes a clock oscillator 40, which, by way of example, operates at 5 megahertz (MHz). Clock oscillator 40 generates a timing signal input to each of I channel PN code generator 42 and Q channel PN code generator 44. Each code generator is implemented as a synchronous, equal rate linear feedback shift register generator which generates the respective in-phase I and quadrature-phase Q channel PN codes, respectively. The PN codes are preferably selected to have low cross-correlation and high auto-correlation properties. Exemplary PN codes include Gold codes and linear sequences.

By way of example, the I channel code may be selected from a family of linear sequences or Mersenne prime codes, and would be relatively short to reduce the number of code phase shifts which must be searched at the receiving station. Preferably, the Q channel code is nominally selected to ensure a secure and preferably extended epoch code for maximum protection of the underlying traffic or digital data signal. I channel PN code generator 42 outputs the PN code to unique word detector (UWD) 46 which detects a specific pattern in the I channel code. Upon detection of the specific pattern in the I channel code, UWD 46 outputs a synchronization or reset signal to Q channel code generator 44 in order to reset Q channel code generator 44 to a known state and thus synchronize the I and Q channels.

PN code generator 44 outputs a PN code, and the underlying data or traffic is added to the PN code at exclusive-OR block 48. As described above, the underlying traffic is preferably binary or modulo-2. The I and Q channel modulating sequences are then applied to a balanced QPSK modulator 50. Prior to input to QPSK modulator 50, the respective I and Q channels are passed through a conversion circuit 52 which preferably includes a transistor-transistor logic (TTL) to bipolar logic circuitry conversion. Balanced QPSK modulator 50 includes a quadrature hybrid 54 which receives a local oscillator signal from phase locked oscillator (PLO) 56. Quadrature hybrid 54 outputs two signals which are 90 degrees out of phase. One signal, $\sin(\omega t)$, is input to mixer 58 and mixed with the I channel PN code. A second signal, $\cos(\omega t)$ is input to mixer 60 and mixed with the PN code added to the underlying data signal. The respective outputs of mixers 58, 60 are applied to power combiner 62. Power combiner adds the respective I and Q channel signals to generate a DS-SS QPSK signal. The QPSK signal is typically upconverted and transmitted by transmitter 24 of FIG. 1. In a slight modification, a quadraphase or staggered QPSK (SQPSK) signal may be generated by introducing a time delay in the orthogonal keying sequence.

Figure 3:
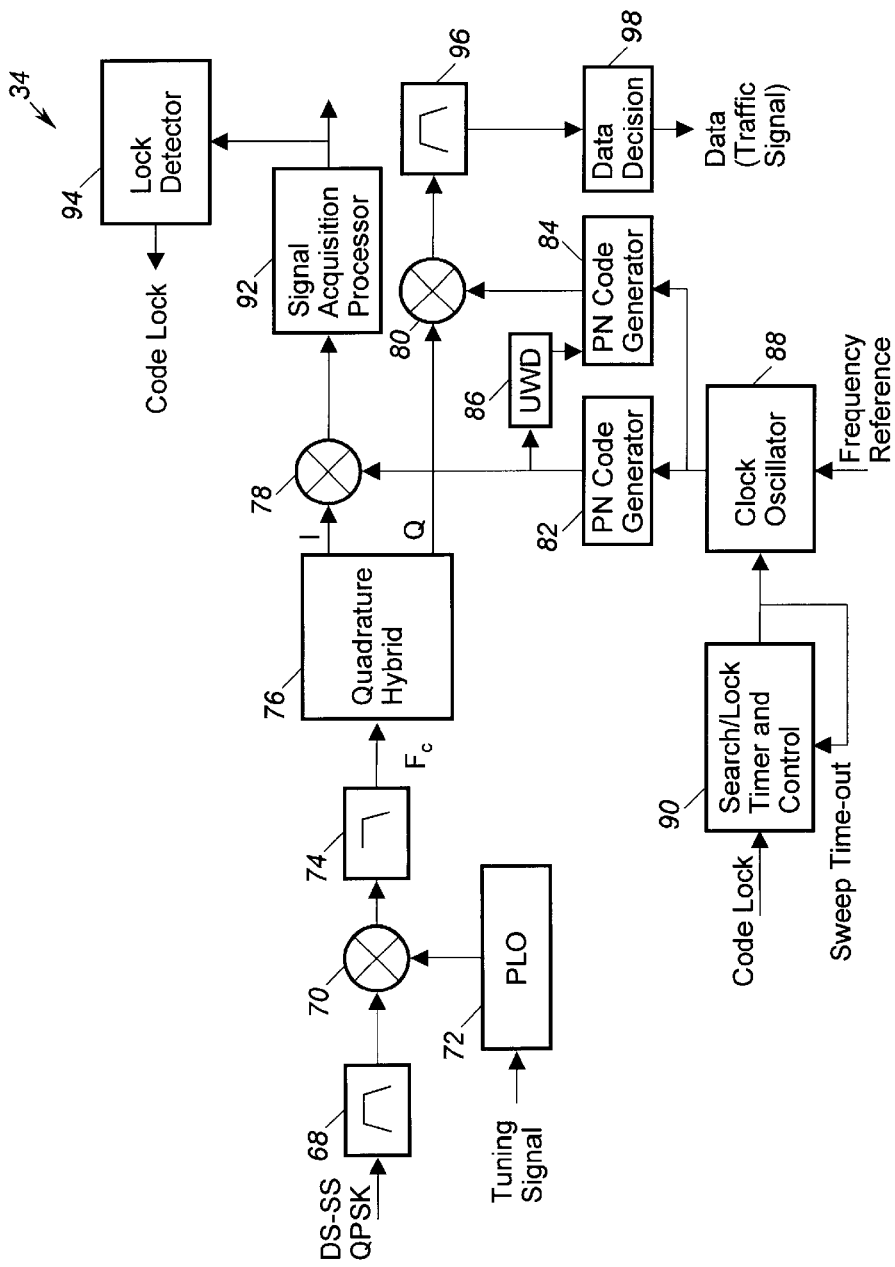
FIG. 3 is a block diagram of the demodulator portion of the spread spectrum modem of FIG. 1.

FIG. 3 depicts an expanded block diagram of demodulator 34 of FIG. 1. Demodulator 34 receives the DS-SS QPSK data signal output by modulator 22 as described in FIG. 2. The DS-SS QPSK signal is nominally a 70 MHz intermediate frequency signal having a small frequency offset $F_c$. The QPSK signal is input to an intermediate frequency (IF) band pass filter (BPF) 68. IF band pass filter 68 outputs a filtered signal to double balanced mixer 70. Double balanced mixer 70 also receives a coarse tuning signal output from phase locked oscillator (PLO) 72. PLO 72 receives a tuning command to vary the frequency of PLO 72, as will be described in greater detail herein. IF band pass filter 68 and double balanced mixer 70 effect a down-conversion of the QPSK signal received by demodulator 34.

The down-converted signal is input to low pass filter 74 which outputs a signal with frequency offset $F_c$. The frequency offset signal is input to quadrature hybrid 76. The components of demodulator 34 described thus far effectively process a received signal derived from an intermediate frequency at the receiving terminal location, such as VSAT 14. The intermediate frequency is a frequency translated version of the downlink or received signal derived from a chain defined by a receiving antenna, low noise amplifier, down-converter, and intermediate frequency amplifier. The intermediate frequency is nominally selected at 70 MHz or some common frequency at which the VSATs 12; 14 operate.

The incoming IF signal is preferably centered somewhere in the IF passband, and must reside between the band edges of IF bandpass filter 68. The signal output from IF bandpass filter 68 is translated down to a lower frequency by double balanced mixer 70 and confined to the low pass range by low pass filter 74. This limits the frequency range over which quadrature hybrid 76 provides a 90 degree phase shift in one channel and a nominal zero degree phase shift in the other channel. Once carrier identification and measurements have been determined, PLO 72 and mixer 70 adjusts the center frequency of the translated signal.

Quadrature hybrid 76 outputs an I channel and a Q channel signal. The I and Q channel signals, however, do not correspond to the I and Q channel signals of FIG. 2. Rather, the I and Q channels of demodulator 34 in FIG. 3 represent signals in which the I and Q channels of modulator 22 of FIG. 2 are rotated and summed together. Thus, while the I and Q channels output by quadrature hybrid 76 represent a 90 degree phase shift between the respective channels, the absolute phase may be shifted from the phase of the I and Q channels of modulator 22 of FIG. 2.

The I channel output by quadrature hybrid 76 is input to mixer 78, and the Q channel output by quadrature hybrid 76 is input to mixer 80. Mixers 78, 80 also receive PN codes generated by respective PN code generators 82, 84. PN code generator 82 outputs a PN code to mixer 78 which is identical to the PN code output by PN code generator 42 of modulator 22 of FIG. 2 to define a replica PN code. PN code generator 82 also outputs the I channel replica PN code to unique word detector (UWD) 86. UWD 86 operates as described above in FIG. 2. In particular, UWD 86 receives the PN code output by PN code generator 82 and generates a synchronization signal to PN code generator 84 in order to properly synchronize the PN codes output by PN code generators 82, 84. PN code generator 84 outputs a PN code which is a replica to that output by PN code generator 44 of FIG. 2.

PN code generators 82, 84 receive a clock signal output by clock oscillator 88. Clock oscillator 88 receives a frequency reference signal which defines a general reference frequency for clock oscillator 88. Clock oscillator 88 also receives a frequency control signal output by search/lock timer and control circuit 90. Timing circuit 90 outputs a frequency control signal to clock oscillator 88.

The frequency control signal varies operation of clock oscillator 88 in order to enable proper alignment of the I channel with the PN code output by PN code generator 82. Signal acquisition processor 92 detects this alignment. The frequency control signal input to clock oscillator 88 facilitates a frequency sweep, a fine frequency dither, and eventual frequency lock of the clock oscillator signal output by clock oscillator 88. Upon alignment and acquisition, a code lock signal is input to timing circuit 90 to indicate acquisition and tracking of the underlying data.

As will be described in greater detail in FIGS. 4–6, signal acquisition processor 92 searches for a narrow band spectral line to determine proper alignment of the I channel code and subsequently measures the amplitude and fine frequency associated with the I channel carrier signal. Signal acquisition processor 92 carries out a code phase search utilizing a conventional code phase step-procedure. The step-procedure advances or retards the replica PN code output by PN code generator 82 at a uniform rate. The correct I channel code phase is detected when signal acquisition processor 92 successfully extracts the narrow-band line components. This component corresponds to the despread I channel carrier. Because the I channel carrier is not modulated by the underlying traffic signal, the aligned PN code condition provides a narrow band tone which may be detected at a very low received signal to noise ratios (SNRs) using a Fast Fourier Transform (FFT) processor. Upon detection of the I channel code phase, signal acquisition processor 92 outputs a tuning signal which is input to phase locked oscillator 72. The tuning signal is also input to lock detector 94 which detects when the demodulator has locked onto the I channel code phase and outputs a code lock signal which is input to timing circuit 90.

Proper alignment of the I channel code provides proper alignment of the Q channel code because unique word detector 86 enables synchronization between PN code generators 82, 84. When the replica PN codes output by PN code generators 82, 84 are in alignment with the received signal PN codes, which were output by modulator 22, the quadrature channel is despread in the conventional manner by mixing the Q channel output from quadrature hybrid 76 with the PN replica code output by PN code generator 84. Mixer 80 effects the mixing and outputs a signal which corresponds to the Q channel of FIG. 2 and thus corresponds to the underlying data signal. Thus, the mixing occurring at mixer 80 effectively rejects any I channel portion of FIG. 2 mixed into the Q channel output from quadrature hybrid 76. The Q channel data is input to bandpass filter 96, and the band pass filter signal is input to data decision block 98. Data decision block 98 operates on the despread Q channel carrier in order to output the data or traffic signal initially introduced in FIG. 2.

Figure 4:
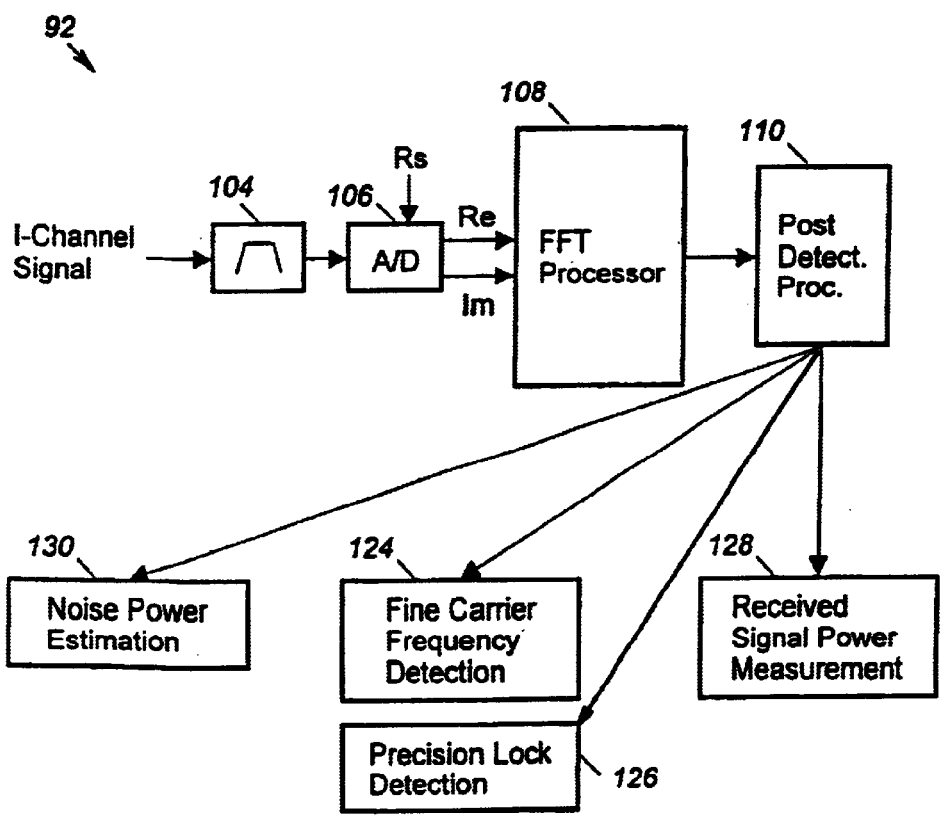
FIG. 4 is a block diagram of the signal acquisition processor of the demodulator of FIG. 3.

FIG. 4 depicts an expanded block diagram of signal acquisition processor 92 of FIG. 3. Signal acquisition processor 92 receives the signal output by mixer 78. The I channel signal is input to band pass filter 104 which, in the example, has a band pass range of between 5 and 10 MHz and a 3 decibel (dB) band width. Band pass filter 104 acts as an anti-aliasing filter in preparation for performing a FFT on the I channel signal. When the PN code output by PN code generator 82 is aligned with the I channel signal, band pass filter 104 outputs despread tone and noise components, which are input to analog-to-digital (A/D) converter 106. A sampling rate Rs is input to A/D converter 106 to define the sampling rate for the A/D converter. A/D converter 106 is implemented as a two channel converter and outputs the real Re and imaginary Im portions of the I channel signal. The real and imaginary portions of the I channel signal output by A/D converter 106 are input to Fast Fourier Transform (FFT) processor 108.

FFT processor 108 performs a Fast Fourier Transform on the respective real and imaginary inputs, and provides a frequency spectrum to post detection processor 110. By way of example, FFT processor 108 outputs a new FFT approximately every 100 milliseconds and has a bin resolution of approximately 100 Hz. Post detection processor 110 searches for peaks which indicate that the I channel signal has been despread. FFT processor 108 in one embodiment provides a tone detection processing gain of 10 log(13 MHz/100 Hz)=51 dB, which is the logarithm of the ratio of the sampling rate to the bin resolution.

Post detection processor 110 performs several functions as will be described herein. In particular, post detection processor (1) provides a noise power estimation, (2) provides fine carrier frequency detection, (3) performs precision lock detection, and (4) outputs a received signal power measurement indication.

Figure 5:
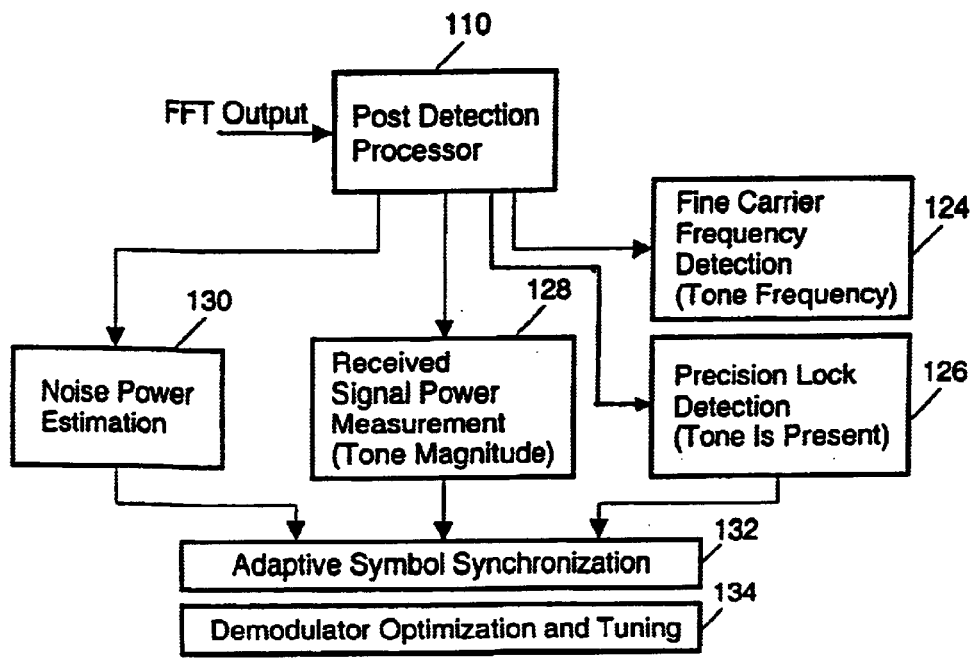
FIG. 5 is a block diagram of the post detection processor of FIG. 4.
Figure 6:
FIG. 6 is a fast Fourier transform spectrum for an incoming signal onto which the demodulator has not locked.
Figure 7:
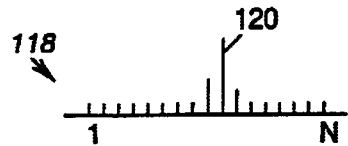
FIG. 7 is a fast Fourier transform spectrum for an incoming signal onto which the demodulator has locked.

FIG. 5 depicts an expanded block diagram of post detection processor 110. Post detection processor receives a block-data output from FFT processor 108. With reference to FIG. 6, FIG. 6 depicts a spectral estimate 116 representative of the output of FFT processor 108 when detection and acquisition of the I channel signal has not occurred. Correspondingly, FIG. 7 depicts a spectral estimate 118 which is output by FFT processor 108 when the I channel signal has been detected and acquired. As can be seen in FIG. 6, the spectral estimate output by FFT processor 108 appears as noise and-self noise. On the other hand, the spectral estimate of FIG. 7 output by FFT processor 108 upon acquisition and detection of the I channel signal includes a substantial peak which represents the desired tone 120.

Post detection processor 110 of FIGS. 4 and 5 enables detection of the desired tone and other parametric data upon detection and acquisition of the I channel signal. Of particular importance, post detection processor 110 enables the recovery of the code phase and the carrier frequency and enables fine tracking of each parameter. Upon determination of the code phase and the carrier frequency, the tone frequency may be detected. Such acquisition results by determining and measuring the largest Fast Fourier Transform output point, such as desired tone 120 of FIG. 7.

Post detection processor 110 outputs several parameters. For example, as shown at block 124, post detection processor 110 performs fine carrier detection to output the tone frequency. As shown at block 126, post detection processor 110 performs precision lock detection which outputs a signal indicating whether a tone is present. That is, precision lock detection block 126 indicates the PN code output by PN code generator 82 is of the proper phase. Such detection and acquisition occurs by varying operation of clock oscillator 88 of FIG. 3 as described above.

Post detection processor 110 also determines the tone magnitude at received signal power measurement block 128 and a noise power estimate at noise power estimation block 130. The noise power estimate can be used to refine link budgets and transmit power adjustments, in order to improve the efficiency of this system and to improve the capability of the systems to operate at relatively low signal to noise ratios.

The noise power estimate, the tone magnitude, the tone frequency, and the tone presence signals are input to adaptive symbol synchronization block 132 and to demodulator optimization and tuning block 134. Adaptive symbol synchronization block generates command signals output to timing circuit 90 of FIG. 3 in order to effect a frequency sweep and frequency dither of clock oscillator 88. Demodulator optimization and tuning block 134 performs fine frequency measurements of the tone and generates a tuning command to PLO 72 of FIG. 3. Preferably, demodulator optimization and tuning block 134 introduces a slight frequency offset so that the output $F_c$ from zonal filter 74 of FIG. 3 is other than 0 Hz.

Figure 8:
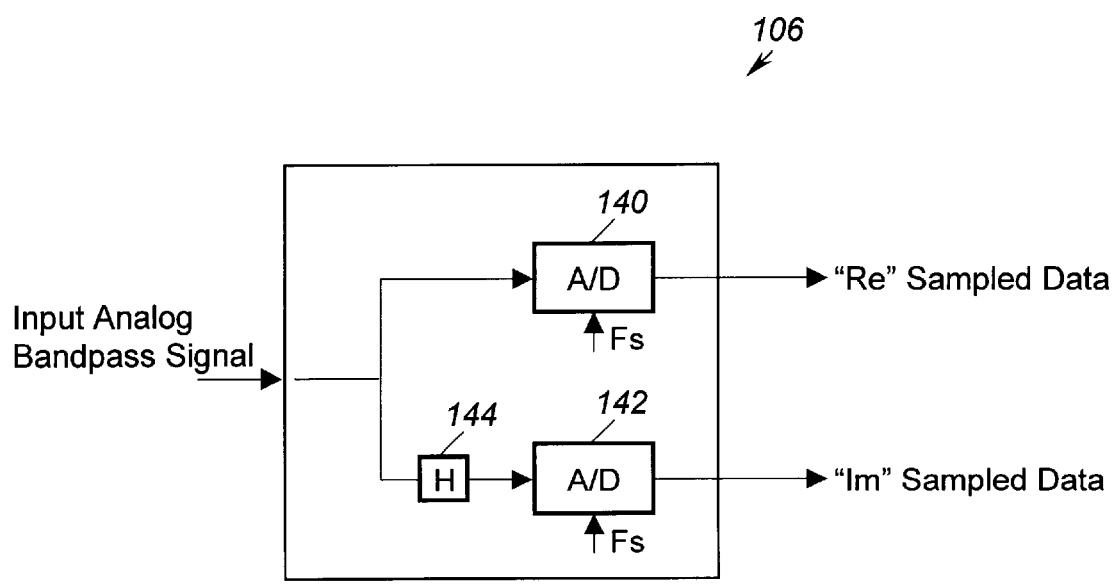
FIG. 8 is a block diagram of the analog-digital converter of FIG. 4.

FIG. 8 depicts an expanded block diagram of two channel A/D converter 106 of FIG. 4. Two channel A/D converter 106 includes a pair of single channel A/D converters 140, 142. Two channel A/D converter 106 receives an input analog band pass signal which is applied directly to A/D converter 140. The input signal is also applied to Hilbert transform block 144. Hilbert transform block 144 introduces a 90 degrees phase shift to the signal applied to A/D converter 142. Each A/D converter 140, 142 receives a signal Fs which define the sampling frequency or rate for two channel A/D converter 106. A/D converter 140 outputs the real portion of the sampled data, and AND converter 142 outputs the imaginary portion of the sampled data. Thus, A/D converter 106 enables complex sampling of the input analog band pass signal.

The subject invention offers several features and benefits. In particular, the frequency, amplitude, and chip timing for the I channel processing enables acquisition of precise downlink frequency, monitoring environmental path losses, and acquisition of PN code timing. The I channel processing can thus occur at received SNRs which are well below 0 db. Such processing can either supplement or replace conventional PN code acquisition circuits.

If the signal quality fades as a result of weather or other environmental phenomena, the initial signal acquisition may be established at a very low SNRs. When signal quality improves or communication must occur, the uplink transmit power may be increased by a predetermined amount and a more conventional Q channel acquisition and despreading process may be performed. At the demodulator, the Q channel SNR will increase to the minimum permitted for data communication at specific bit error rates. This feature may be particularly useful where the data signal must be hidden or when it is desirable to minimize commercial impact of large transponder back-off losses. Thus, the modem permits fine resolution of the received signal parameters. A despreader and demodulator which utilizes such parametric measurement techniques for acquisition and channel characterization will improve acquisition and signal tracking performance where transmission preferably occurs at minimum power levels required for acquisition and communication.

The modem described herein enables PN code acquisition despite high thermal noise and interfering signal power levels. The fine resolution digital signal processing technique described above enables enhanced code lock detection. Utilizing a FFT lock detector and signal parameter measurement techniques extends signal acquisition performance to input SNRs which are bounded by FFT carrier frequency resolution capability rather than more traditional spread spectrum processing gain limits. Further, Doppler shift and carrier frequency drift effects may be tracked and corrected utilizing the above-described signal parameter tracking algorithms implemented by the post detection processor.

In a preferred embodiment, the above-described modem will acquire the spread spectrum signal at input SNRs of −30 to −25 dB, and utilizes the more conventional input pop-up SNR of −13 dB for communication. The I channel PN code will be a preferred sequence polynomial, with R=18 or less. With R=18, a frame contains $2^{18}-1=262,143$ code chips. The spread spectrum chip rate is nominally 5 MHz, providing a frame rate of 5 MHz÷262,143 chips=19.0735 Hz. If the replica code generator operates at 4.9 MHz, the replica code frame rate is 18.692 Hz. If the replica code generator operates at 5.1 MHz the replica code frame rate is 19.455 Hz. Utilizing the higher replica code clock rate, the slew rate is 19.455 Hz−19.0735 Hz=0.381 frames per second. Using the slew rate, the entire replica code frame will slide by the received code in 1/0.381=2.62 seconds.

While the invention has been described in its presently preferred form, it is to be understood that there are numerous applications and implementations for the present invention. Accordingly, the invention is capable of modification and changes without departing from the spirit of the invention as set forth in the appended claims.

I claim:

1. A spread spectrum modem apparatus comprising:
a modulator, the modulator modulating data and spread spectrum codes onto a spread spectrum signal having a first channel component and a second channel component, wherein the data and a first spread spectrum code are modulated onto the first channel component and a second spread spectrum code is modulated onto the second channel component; and
a demodulator, the demodulator receiving the spread spectrum signal and generating first and second output signals which include the first channel and second channel components, the demodulator further acquiring the second spread spectrum code in the second channel component and acquiring the first spread spectrum code based upon the acquired second spread spectrum code, the demodulator determining the data by despreading the spread spectrum signal based upon the acquired first and second spread spectrum codes,
wherein the demodulator includes a signal acquisition processor, the signal acquisition processor determining if the first output signal is coincident with the one of the first and second spread spectrum codes, the one of the first and second spread spectrum codes being aligned with the one of the first and second spread spectrum codes of the first channel component, wherein the signal acquisition processor generates a tuning signal in accordance with the alignment of the codes.

2. The apparatus of claim 1 wherein one of the first and second spread spectrum codes comprises a short acquisition pseudonoise code and wherein the other of the first and second spread spectrum codes comprises a long acquisition pseudonoise code.

3. The apparatus of claim 2 wherein the second spread spectrum code varies in accordance with the first spread spectrum code.

4. The apparatus of claim 1 wherein the demodulator acquires the first and second spread spectrum codes in the spread spectrum signal when the spread spectrum signal has a signal to noise ratio (SNR) less than 0 decibel (dB).

5. The apparatus of claim 1 wherein the demodulator acquires the first and second spread spectrum codes in the spread spectrum signal when the spread spectrum signal has a signal to noise ratio (SNRS) less than 0 decibel (dB) and wherein the SNR for acquisition is less than the SNR for communication of data.

6. The apparatus of claim 1 wherein the modulator generates a signal using a quadrature-phase shift keying (QPSK) format, and one of the first and second channel components is an in-phase portion of the QPSK format and the other of the first and second channel components is a quadrature-phase portion of the QPSK format.

7. The apparatus of claim 6 wherein the first channel component is the quadrature-phase portion and the second channel component is the in-phase portion.

8. The apparatus of claim 1 wherein the modulator modulates the data using a staggered quadrature-phase shift keying (SQPSK) format, and one of the first and second channel components is an in-phase portion of the SQPSK format and the other of the first and second channel components is a quadrature-phase portion of the SQPSK format.

9. The apparatus of claim 8 wherein the first channel component is the quadrature-phase portion and the second channel component is the in-phase portion.

10. A spread spectrum communication system comprising:
a modulator, the modulator modulating data and spread spectrum codes onto a spread spectrum signal having an in-phase component and a quadrature-phase component, wherein the data and a first spread spectrum code are modulated onto the in-phase component and a second spread spectrum code is modulated onto the quadrature-phase component;
a transmitter, the transmitter receiving the spread spectrum signal and amplifying the spread spectrum signal for transmission;
a receiver, the receiver receiving the transmitted signal obtaining the spread spectrum signal from the received signal; and
a demodulator, the demodulator receiving the spread spectrum signal from the receiver and acquiring the second spread spectrum code in the quadrature-phase component and acquiring the first spread spectrum code based upon the acquired second spread spectrum code, the demodulator determining the data by despreading the spread spectrum signal based upon the acquired first and second spread spectrum codes, wherein the demodulator further comprises:
a power divider, the power divider receiving the spread spectrum signal and generating first and second output signals which include the in-phase and quadrature-phase components of the spread spectrum signal;
a first mixer, the first mixer mixing the first output signal with the one of the first and second spread spectrum codes;
a second mixer, the second mixer mixing the second output signal with the other of the first and second spectrum codes;
a timer control circuit, the timer control circuit varying the phase of the first and second spread spectrum codes with respect to a system time reference; and
a signal acquisition Processor, the signal acquisition processor determining if the first output signal is coincident with the one of the first and second spread spectrum codes, the one of the first and second spread spectrum codes being aligned with the one of the first and second spread spectrum codes of the in-phase component, wherein the signal acquisition processor generates a tuning signal in accordance with the alignment of the codes.

11. The system of claim 10 wherein the modulator comprises:

a first code generator, the first code generator generating the first spread spectrum code;

a second code generator, the second code generator generating the second spread spectrum code;

a first mixer, the first mixer generating the in-phase component of the spread spectrum signal in accordance with an in-phase signal and one of the first and second spread spectrum codes;

a second mixer, the second mixer generating the quadrature-phase component of the spread spectrum signal in accordance with a quadrature-phase signal and the other of the first and second spread spectrum codes; and a combiner for summing the in-phase and quadrature-phase components to generate the spread spectrum signal.

12. The system of claim 10 wherein the demodulator further comprises:

a phase lock oscillator, the phase lock oscillator receiving the tuning signal from the signal acquisition processor, the phase lock oscillator generating a frequency adjustment signal; and a mixer for receiving the frequency adjustment signal, the mixer mixing the received spread spectrum signal with the frequency adjustment signal to adjust a frequency of the received spread spectrum signal.

13. The system of claim 10 wherein the demodulator further comprises a lock detector, the lock detector receiving the tuning signal from the signal acquisition processor and generating a lock signal, the lock signal being received by a timer circuit to indicate that the first and second codes are aligned.

14. The system of claim 10 further comprising a low pass filter, the low pass filter receiving the output of the second mixer and filtering the output of the second mixer to eliminate frequencies above a predetermined threshold, the output of the low pass filter being the data.

15. The system of claim 10 wherein one of the first and second spread spectrum codes comprises a-short acquisition pseudonoise code and wherein the other of the first and second spread spectrum codes comprises a long acquisition pseudonoise code.

16. The system of claim 15 wherein the second spread spectrum code varies in accordance with the first spread spectrum code.

17. The system of claim 10 wherein the demodulator acquires the first and second spread spectrum codes in the spread spectrum signal when the spread spectrum signal has a signal to noise ratio (SNR) less than 0 decibel (dB) and wherein the SNR for acquisition is less than the SNR for communication of the data.

18. A method for modulating and demodulating data for a spread spectrum communication system comprising the steps of:

modulating the data and spread spectrum codes into a spread spectrum signal having first and second channel components including the steps of:

adding the data to a first spread spectrum code and combining the resultant signal with a first carrier signal, to define the first channel component;

combining the second spread spectrum code with a second carrier signal, the first carrier signal being related to the second carrier signal, to define the second channel component; and adding the first and second channel components to define the spread spectrum signal;

transmitting the spread spectrum signal;

receiving the spread spectrum signal; and demodulating the received spread spectrum signal to obtain the data, including the steps of:

separating the spread spectrum signal substantially into third and fourth channel components;

comparing the fourth channel component with a substantial replica of the second spread spectrum code and varying the replica of the second spread spectrum code with the fourth channel component to align the fourth channel component with the replica of the second spread spectrum code;

generating a lock signal upon alignment of the fourth channel component with the replica of the second spread spectrum code;

combining the third channel component with a replica of the first spread spectrum code to output a first data signal; and filtering the first data signal to yield the data.

* * * * *